(12) United States Patent
Duernberger

(10) Patent No.: US 10,711,468 B2
(45) Date of Patent: Jul. 14, 2020

(54) PANEL AND PANEL ASSEMBLY COMPRISING A PLURALITY OF SUCH PANELS

(71) Applicant: KAINDL FLOORING GmbH, Wals (AT)

(72) Inventor: Gerhard Duernberger, Strasswalchen (AT)

(73) Assignee: KAINDL FLOORING GMBH, Wals (AT)

( * ) Notice: Subject to any disclaimer, the term of this patent is extended or adjusted under 35 U.S.C. 154(b) by 0 days.

(21) Appl. No.: 15/772,663

(22) PCT Filed: Oct. 31, 2016

(86) PCT No.: PCT/EP2016/076204
§ 371 (c)(1),
(2) Date: May 1, 2018

(87) PCT Pub. No.: WO2017/076794
PCT Pub. Date: May 11, 2017

(65) Prior Publication Data
US 2019/0085568 A1     Mar. 21, 2019

(30) Foreign Application Priority Data

Nov. 2, 2015    (DE) .................... 10 2015 221 420
Nov. 10, 2015   (DE) .................... 10 2015 222 111

(51) Int. Cl.
*E04F 15/10*        (2006.01)
*B44C 5/04*         (2006.01)
*B32B 3/14*         (2006.01)

(52) U.S. Cl.
CPC .............. *E04F 15/107* (2013.01); *B32B 3/14* (2013.01); *B44C 5/04* (2013.01); *E04F 15/102* (2013.01); *B32B 2419/00* (2013.01)

(58) Field of Classification Search
CPC ........ E04F 15/107; E04F 15/102; B44C 5/04; B32B 3/14
(Continued)

(56) References Cited

U.S. PATENT DOCUMENTS 5,117,603 A     6/1992   Weintraub
8,287,985 B2 * 10/2012   Sjoberg ..................... B44C 1/24
                                                          428/156
(Continued)

FOREIGN PATENT DOCUMENTS

CH             444 679          11/1967
CH             446679 A * 11/1967 ............ E04F 15/022
(Continued)

OTHER PUBLICATIONS

German Office Action conducted in counterpart German Appln. No. 10 2015 222 111.3 (dated Jun. 14, 2016) (w/ machine translation).
(Continued)

*Primary Examiner* — Brian E Glessner
*Assistant Examiner* — Adam G Barlow
(74) *Attorney, Agent, or Firm* — Greenblum & Bernstein, P.L.C.

(57) ABSTRACT

The invention relates to a rectangular panel intended for lining a substrate, which panel comprises a base element comprising a decorative design on the visible surface thereof remote from the substrate. The decorative design depicts a plurality of strips shaped as parallelograms, one pair of parallelogram sides in each case forming a portion of the long side of the panel while the two other sides of the parallelogram extend obliquely to the longitudinal direction of the panel. According to the invention, at least two strips have a strip width that is different from one another.

20 Claims, 5 Drawing Sheets

(58) Field of Classification Search
USPC .......... 52/177, 311.1, 311.2, 313, 314, 740.1
See application file for complete search history.

(56) References Cited

U.S. PATENT DOCUMENTS

| | | | |
|---|---|---|---|
| 8,800,245 B1 * | 8/2014 | Pien ................. | E04F 15/02172 |
| | | | 428/411.1 |
| 2004/0170812 A1 | 9/2004 | Sjoberg | |
| 2006/0032168 A1 | 2/2006 | Thiers et al. | |
| 2006/0194015 A1 | 8/2006 | Sabater et al. | |
| 2013/0045364 A1 | 2/2013 | Sjoberg | |

FOREIGN PATENT DOCUMENTS

| | | | |
|---|---|---|---|
| CN | 2410355 | 12/2000 | |
| CN | 101115894 | 1/2008 | |
| CN | 101302913 | 11/2008 | |
| CN | 101421474 | 4/2009 | |
| CN | 104149142 | 11/2014 | |
| DE | 201 01 021 | 8/2001 | |
| EP | 2921296 | 10/2012 | |
| RU | 2062850 | 6/1996 | |
| WO | 02/090129 | 11/2002 | |
| WO | 2004/063491 | 7/2004 | |
| WO | WO-2004063491 A1 * | 7/2004 | .............. E04F 15/04 |
| WO | 2006/067642 | 6/2006 | |

OTHER PUBLICATIONS

China Office Action conducted in counterpart China Appln. No. 201680077397.1 (dated Sep. 15, 2019) (w/ English language translation).

* cited by examiner

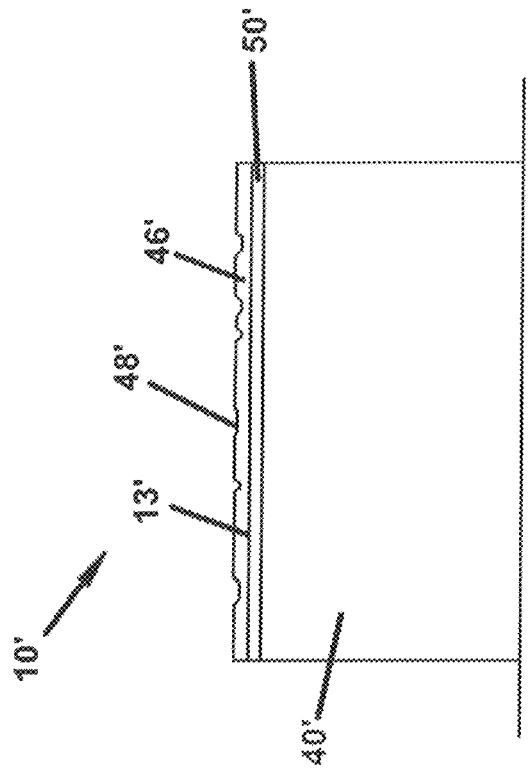
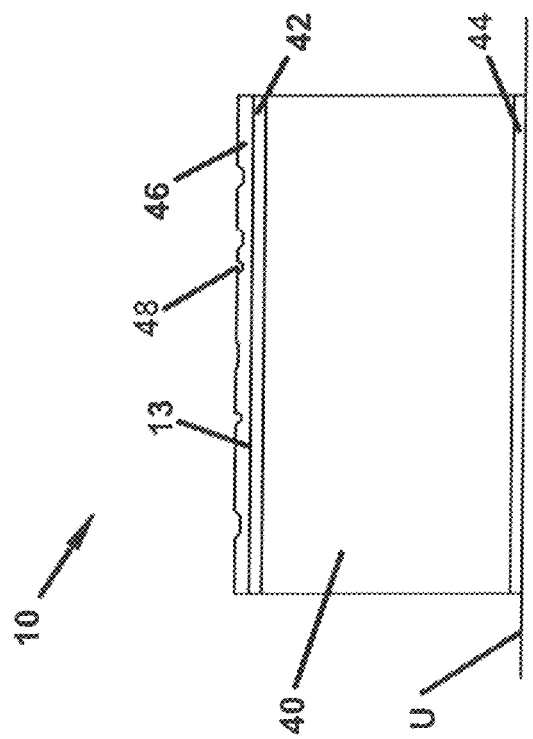
Fig. 5
Fig. 6

PANEL AND PANEL ASSEMBLY COMPRISING A PLURALITY OF SUCH PANELS

The invention relates to a rectangular panel that is intended for lining a substrate and comprises a base element comprising a decorative design on the visible surface thereof remote from the substrate, the decorative design depicting a plurality of strips shaped as parallelograms, one pair of parallelogram sides in each case forming a portion of the long side of the panel while the two other sides of the parallelogram extend obliquely to the longitudinal direction of the panel.

DE 201 01 021 U1 discloses panels that create the impression of a herringbone parquet floor when laid accordingly.

Furthermore. DE 201 01 021 U1 discusses further prior art, without specifying the source, in which the decorative design of the panels depicts strips that end in sharp corners. The present invention proceeds from this prior art that is not described in greater detail in DE 201 01 021 U1.

Both types of panels have the disadvantage that the panels must be laid so as to fit precisely in order to create the desired impression of a parquet floor having a herringbone pattern or herringbone-like pattern.

In contrast, the object of the present invention is to provide panels intended for lining a substrate, which panels both give the impression of a herringbone-like pattern and are also easy to lay.

This object is achieved according to the invention by panels of the type mentioned at the outset, in which at least two strips, preferably at least two groups of strips, have a strip width that is different from one another. As a result of this measure, it is no longer necessary to ensure precise fitting when, during laying, a new panel row is joined to a panel row already laid. Specifically, the different strip widths mean that it is in any case no longer possible to precisely align the join lines of adjacent strips of the panels of the panel rows already laid with the join lines of adjacent strips of the panels of the panel rows to be newly laid. Instead, a precisely fitted alignment of this kind would at most occur coincidentally. Overall, an irregular but nonetheless herringbone-like flooring pattern thus results.

It is conceivable in principle for the strips to have any desired decorative design. In extreme cases, the decorative design of each strip may be from a different class of decorative design. In connection with the present invention, the decorative designs of two strips are considered to belong to a different class of decorative design if they depict a material of a different material type, for example natural stone, wood, plastics material, metal and the like.

However, since herringbone-like flooring patterns are known mainly from parquet floors, and the material type wood is generally used for producing parquet floors, it is preferred for all the strips to depict a decorative design of the same class of decorative design, for example for all the strips to depict a wood decorative design.

Not only in this case, but also when all the strips have a decorative design of the same class of decorative design, it is advantageous for at least two strips, preferably at least two groups of strips, to have a type of decorative design that is different from one another. According to the understanding of the present invention, types of decorative design of a class of decorative design differ from one another in that they depict different materials of the same material typo, for example the materials oak wood, beechwood, cherrytree wood and the like of the material type wood, or the materials granite, marble and the like of the material type natural stone. Of course, the decorative designs of a type of decorative design can differ from one another in terms of the wood grain or stone structure specifically depicted. This measure makes it possible to further increase the variability of the appearance of the substrate lining.

The same aim is also achieved by the measure whereby at least two strips, preferably at least two groups of strips, have a colouration that is different from one another, even when the decorative design of the strips otherwise belong to the same class of decorative design and the same type of decorative design.

In order to achieve the herringbone-like appearance, it is further proposed, in a development of the invention, for the two other sides of the parallelogram, together with the longitudinal direction of the panel, to enclose an angle of between approximately 30° and approximately 60°, preferably approximately 45°.

In order to be able to further improve the appearance of the decorative design, it is further possible for two adjacent strips to be separated from one another by means of a visual joint.

In order to increase the realistic impression of the herringbone-like pattern of the substrate lining formed from a plurality of panels, it is proposed, in a development of the invention, for the decorative design to be formed adjacently to the short sides of the panel, such that, when the short sides of two identically designed panels provided with an identical decorative design adjoin one another, the decorative designs of the two panels transition into one another. It should be noted at this point that, due to being depicted only in part on each of the two adjoining panels, the strips that lead into the short sides of the panel are in the shape of a right-angled triangle, a trapezium or a pentagon which results when a right-angled triangle is separated from a parallelogram by means of a straight line extending in parallel with the short side.

In order to design the transition between the decorative designs of the two panels that adjoin one another at the short sides thereof so as to be as unnoticeable as possible, a whole range of measures can be taken:

Firstly, it is possible for the visual joint between two strips that lead into the short side of the panel to end at a specified distance before the short side of the panel. As a result, it is possible to prevent a jump between the visual joints of two panels of which the short sides adjoin one another, which jump would emphasise any possible misalignment.

Secondly, it is possible for two adjacent strips that lead into the short side of the panel to have the same type of decorative design. For example, a misalignment is less noticeable when two strips depicting an oak wood decorative design are arranged next to one another than when a strip having an oak wood decorative design is arranged next to a strip having a maple wood decorative design.

Thirdly, it is possible for the colourations of two adjacent strips that lead into the short side of the panel to transition into one another at least in a portion adjacent to the join line between the two strips and the short side of the panel.

The measures explained above can in particular conceal manufacturing tolerances caused, in the multi-step process for manufacturing the panels, by the paper growth which is difficult to control and results from impregnating the decor paper with synthetic resin and drying the decor paper after the application thereof to the base plate, by the cutting and milling and similar manufacturing steps.

In a development of the invention, it is conceivable for decor paper to be provided on the side of the panel remote from the substrate, which paper is printed with a wood decorative design. When using decor paper, in order to at least counteract the "cupping" of the panel, even if this "cupping" cannot be completely prevented, it is advantageous for counteracting paper to be arranged on the side of the panel facing the substrate.

However, as an alternative to using decor paper, it is also conceivable for a primer coat to be provided on the side of the panel remote from the substrate, which primer coat is printed with the wood decorative design.

In order to be able to protect the wood decorative design from abrasion and similar damage, it is proposed for a preferably transparent protective layer to be provided on the side of the decor paper printed with the wood decorative design that is remote from the substrate, or on the primer coat printed with the wood decorative design. The protective layer can be formed by a synthetic resin for example.

In order to achieve a natural appearance, it is further proposed for the panel to be provided with a surface structure that is substantially synchronous with the grain of the wood decorative design. The surface structure can be made in the protective layer using an embossing tool for example, preferably an embossing punch or an embossing roll. In this case, at least some of the impressions of the surface structure can have a depth profile.

As is known per se, the base element of the panel can be formed by a MDF sheet (Medium Density Fibreboard) and/or a HDF sheet (High Density fibreboard) and/or an OSB sheet (Oriented Strand Board) and/or particle board sheet and/or plywood and/or strip board and/or gypsum plasterboard and/or a plastics sheet, for example a PVC sheet, in particular what are known as LVTs (Luxury Vinyl Tiles).

The panel according to the invention can be used, for example, as a flooring panel or as a wall lining panel or as a ceiling lining panel or as furniture board or as a work surface.

Furthermore, the length of the panel can be between 500 mm and 2800 mm and/or the width of the panel can be between 180 mm and 800 mm and/or the thickness of the panel can be between 1 mm and 25 mm.

Finally, the panel can be designed to allow connection to other panels at the two long lateral edges thereof and/or the two short lateral edges thereof using connection elements of the tongue and groove type.

According to a further aspect, the invention relates to a panel arrangement comprising a plurality of panels according to the invention, in which the oblique course of the strips of at least one of the panels, preferably approximately half the panels, and the oblique course of at least one other panel, preferably also approximately half the panels, are arranged so as to be mutually opposed. In other words, in a plan view of the decorative design of the panel, some of the obliques, depending on which of the two longitudinal extension directions of the panel is selected as the reference longitudinal direction, extend towards the front right or back left, while the other obliques extend towards the front left or back right. In this case, it is furthermore possible for the angle of the oblique of the at least one panel and the angle of the oblique of the other at least one panel to be of the same size.

The invention will be explained in greater detail in the following, with reference to the accompanying drawings and on the basis of an embodiment. In the drawings:

FIG. 5 is a schematic view of a cross section through a panel according to the invention;

FIG. 6 is a schematic view of a cross section through an alternative panel according to the invention.

Figure 1:
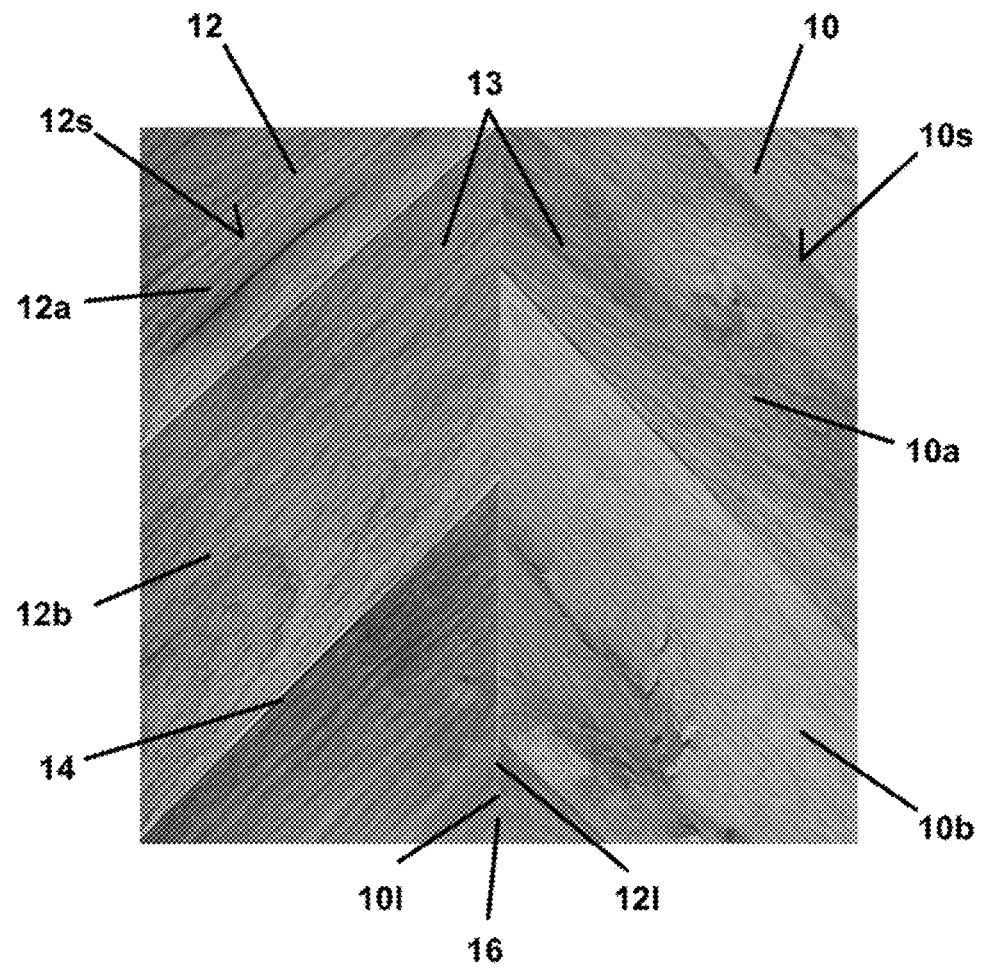
FIG. 1 shows two panels according to the invention, the long rectangle sides of which panels are adjacent to one another.

FIG. 1 shows a detail of two panels 10 and 12 according to the invention, the long sides 10*l*, 12*l* of which are adjacent when laid, such that a laying joint 16 is formed between the two panels 10, 12.

The two panels 10, 12 comprise a decorative design 13 on the visible side 10*s*, 12*s* thereof shown in FIG. 1, which decorative design depicts a plurality of strips 10*a*, 10*b* or 12*a*, 12*b* shaped as parallelograms. In the embodiment shown in FIG. 1, the decorative designs of the strips 10*a*, 10*b* or 12*a*, 12*b* are all wood decorative designs that depict different types of wood in different colourations. Furthermore, the strips 10*a* and 10*b* or 12*a* and 12*b* are of a different width $b_{10a}$ and $b_{10b}$, and $b_{12a}$ and $b_{12b}$, respectively, the width $b_{10b}$ being greater than the width $b_{10a}$, and the width $b_{12b}$ being greater than the width $b_{12a}$ (see also FIG. 4). In order to clearly show the extent of the individual strips 10*a*, 10*b* and 12*a*, 12*b* of the two panels 10 and 12, the decorative design has a visual joint 14 between adjacent strips in each case.

As already mentioned, the strips 10*a*, 10*b* and 12*a*, 12*b* of the two panels 10 and 12 are each formed as parallelograms, specifically as parallelograms having interior angles of approximately 45° and approximately 135°. Therefore, the visual joints 14 also meet the laying joint 16 at an angle of approximately 45° in each case.

Figure 4:
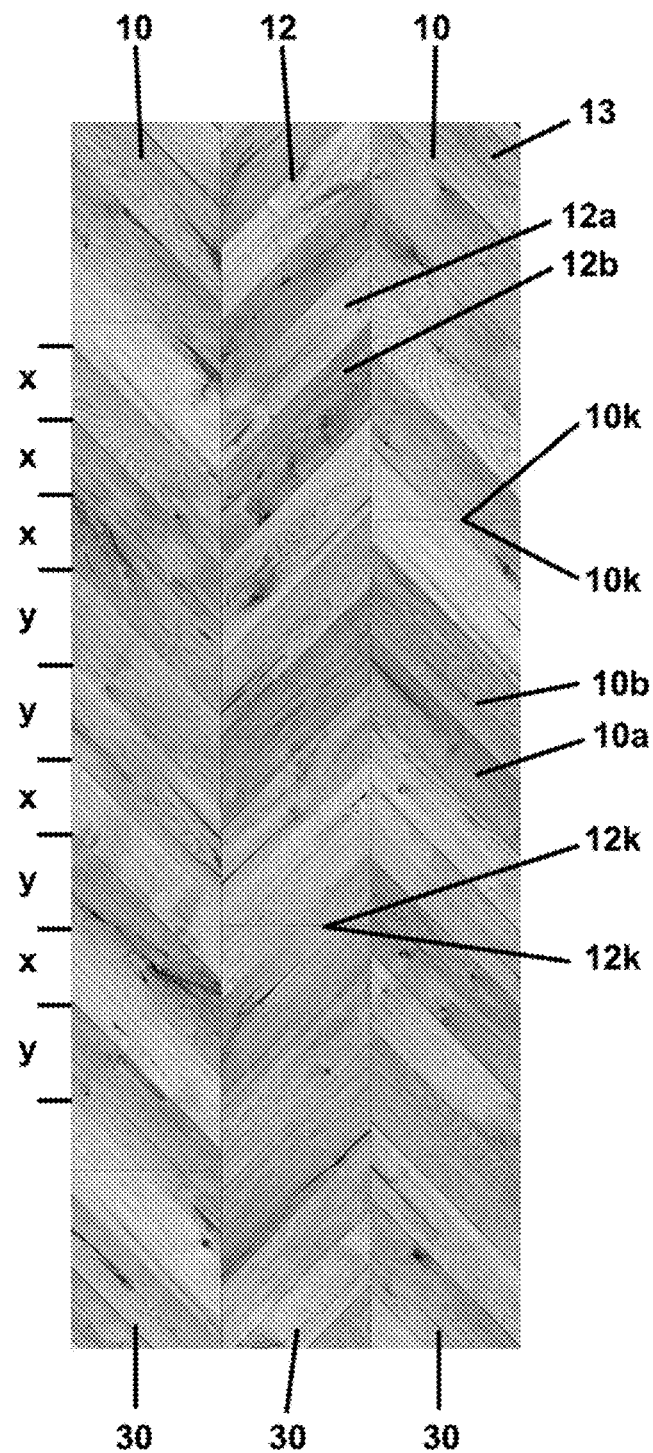
FIG. 4 shows a plurality of adjacently arranged laid rows of panels according to the invention.

In FIG. 4 it can be seen, in addition, that the strips 10*a*, 10*b* and 12*a*, 12*b* of the two panels 10 and 12 are oriented so as to be mutually opposed. While the strips of the panels 10 extend from bottom right to top left in the view in FIG. 4, the strips of the panels 12 extend from bottom left to top right in the view in FIG. 4. This results in the visual effect of a herringbone-like laying pattern. As a result of the different widths of the individual strips 10*a*, 10*b* and 12*a*, 12*b* of the two panels 10 and 12, visual joints 14 of the first panel 10 coincide with visual joints 14 of the second panel 12 at the laying joint 16 only as an exception. This provides the herringbone-like laying pattern with a rustic appearance. The fact, already mentioned above, that the wood decorative designs of the strips depict different types of wood in different colourations further increases the rustic nature of the decorative design (see also FIG. 4).

Figure 2:
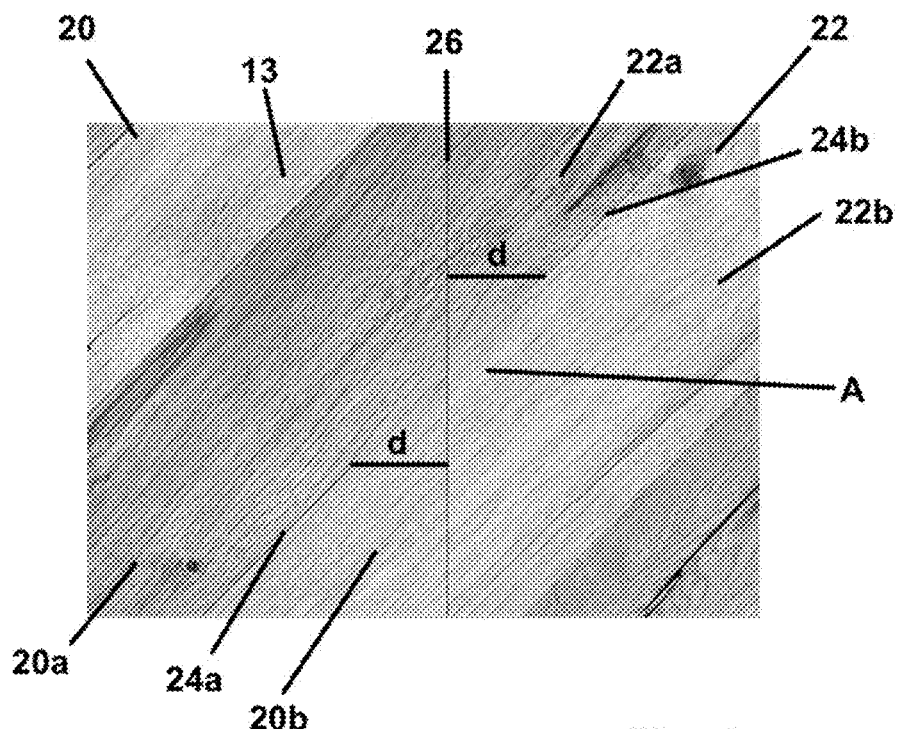
FIG. 2 shows two panels according to the invention, the short rectangle sides of which panels are adjacent to one another.

As can be seen in particular in FIG. 4, in the decorative portions adjacent to the short longitudinal sides 10*k*, 12*k* of the panels 10 and 12, the decorative design 13 is formed such that the decorative designs 13 of two adjacent panels 10 or two adjacent panels 12 transition into one another so as to fit precisely. The measures by which this can be achieved will be explained in greater detail below, with reference to FIGS. 2, 3*a* and 3*b*:

FIG. 2 shows two panels 20 and 22 according to the invention, the short rectangle sides 20*k*, 22*k* of which panels adjoin one another along a laying joint 26. The panel 20 also comprises a decorative design 13 in which two visible strips are denoted 20*a* and 20*b*, while the panel 22 comprises a decorative design 13 in which two visible strips are denoted 22a and 22b. Both the strips 20a and 20b and the strips 22a and 22b adjoin the short rectangle sides 20k and 22k, respectively.

The decorative designs 13 of the two panels 20 and 22 are designed such that, in the laid state shown, the strip 20a transitions into the strip 22a in a precisely fitting and optically flowing manner, and the strip 20b transitions into the strip 22b in a precisely fitting and optically flowing manner, specifically such that the strips 20a and 22a, and 20b and 22b, respectively, together create the impression of a parallelogram strip in each case.

The pairs of strips 20a and 20b, and 22a and 22b, are in each case separated by visual joints 24a and 24b. In order to ensure the impression of a herringbone-like laying pattern even when there is a slight misalignment in the longitudinal direction when the two panels 20 and 22 are laid, i.e. the visual joints 24a, 24b do not meet in a precise manner at the laying joint 26, the strip structure of the laying joint 26 is "softened" adjacently. This region is denoted by reference sign "A" in FIG. 2.

Figure 3:
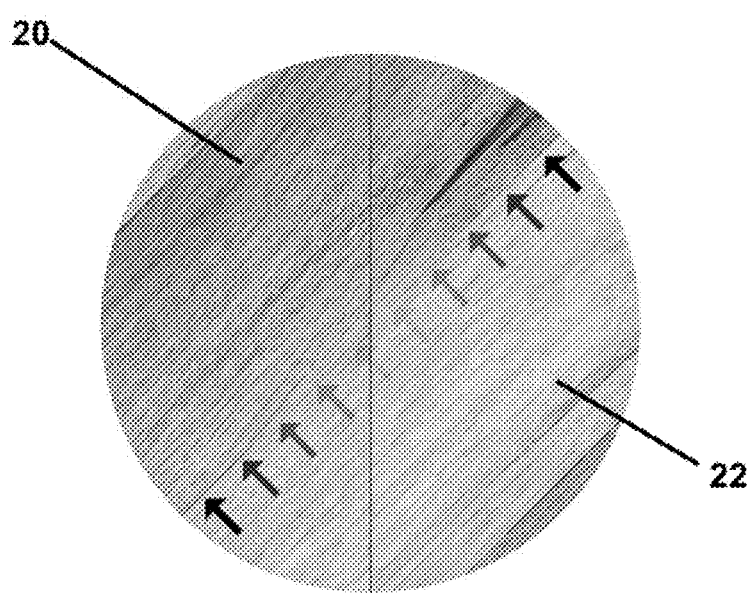
FIG. 3 is an enlarged view of the transition region between two panels.

In this transition region A, the visual joints 24a and 24b first recede visually, and even disappear entirely adjacently to the laying joint 26, as is indicated in FIG. 3 by arrows in different shades of grey. The visual joints 24a and 24b thus end at a specified distance d before the laying joint 26. Secondly, the wood decorative design of the strips 20a and 20b or 22a and 22b depicts the same type of wood. Thirdly, the colours of the decorative designs of the strips 20a and 20b or 22a and 22b transition into one another in the transition region A.

Figure 7:
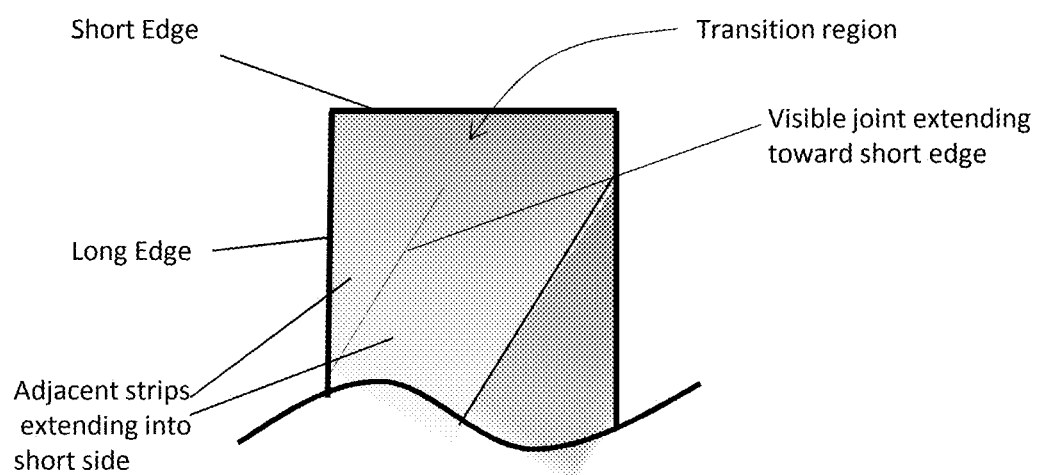
FIG. 7 is a schematic line drawing depiction of the transition region at an end of a panel.

As a result, there is no continuous visual joint of the decorative design, and also no clearly visible joint line, between the two strips 20a, 22a and 20b, 22b, at the laying joint 26. Since the human eye cannot extrapolate the two visual joints 24a and 24b exactly onto one another through the "softened region" A, a slight misalignment between the two panels 20 and 22 will not be noticed, and the prevailing impression will be that of strips that are continuous through the panel boundaries. See also FIG. 7, which depicts the visible joint between the panels extending to the short edge of the panel terminating in the transition region at a distance from the short edge of a panel.

FIG. 4 shows a plurality of laid rows 30 of panels 10 and 12 according to the invention, which rows are arranged adjacently to one another in order to form a continuous substrate lining, for example continuous flooring. The rows are formed alternately of panels 10 and panels 12, which panels differ in terms of the orientation of the strips 10a, 10b and 12a, 12b, respectively, thereof. This results in the mentioned laying pattern that has a herringbone-like impression. The rustic laying appearance discussed in connection with FIG. 1 also develops, since the visual joints 14 between the individual strips coincide along the laying joints 16 at the long sides of the panels 10, 12 only by way of exception. Finally, it should also be noted that, in the case of the panels 10, 12 shown in FIG. 4, only two different strip widths are used for the individual strips, specifically a width x and a width y. However, strips of width x and strips of width y are not arranged strictly alternately but instead in an irregular sequence in order to increase the mentioned rustic impression. As a result, the panels 10, 12 of the individual rows 30 can also be offset relative to one another as desired in the longitudinal direction, without the overall impression of the lining changing.

FIG. 5 is a schematic view of a cross section through a first panel 10 according to the invention, for example the panel from FIG. 1. Therefore, as far as possible the same reference signs are also used as in FIG. 1. The panel comprises a base plate 40. A layer 42 and 44, respectively, is applied to each of the upper face and the lower face of the base plate 40, the layer 42 remote from the substrate U being printed with a decorative design 13. The layer 42 is therefore referred to as the decorative layer, while the layer 44 opposite the decorative layer 42 is referred to as the counteracting layer since it has the function of compensating stresses that may occur in the panel 10 due to shrinkage or expansion of the decorative layer 42, and thus ensures that the panel 10 does not bulge.

Finally, a transparent protective layer 46 is applied to the decorative layer 42, which protective layer may be formed of a synthetic resin or the like for example. A surface structure 48 can moreover be embossed into the protective layer 46, on the upper lace 12 of the panel 10, which surface structure can preferably be substantially synchronous with the decorative design 13 printed on the decorative layer 42. The feel and roughness of said surface structure 48 increases the natural wood-like impression of the panel 10.

FIG. 6 is a schematic view of a cross section through an alternative panel 10' according to the invention. In this panel, applying a separate decorative layer to the base material 40' is omitted, and instead the base material is merely provided with a primer coat 50' that can be printed directly with the decorative design 13'. Similarly to the panel 10 shown in FIG. 5, the panel 10' from FIG. 6 is also provided with a protective layer 46' and a surface structure 48' embossed therein.

The base plate 40 or 40' can be produced for example from MDF (Medium Density Fibreboard), HDF (High Density Fibreboard), OSB (Oriented Strand Board), particle board, PVC (Polyvinyl Chloride), in particular LVT (Luxury Vinyl Tiles) or another suitable material.

When MDF, HDF, OSB or particle board is used as the material of the base plate 40, the layers 42, 44 can preferably be formed of paper, and when PVC is used said layers are preferably formed of plastics material. Furthermore, said layers can be connected to the base plate using synthetic resin for example.

Finally it should also be noted that the decorative designs can be applied to the decorative layer 42 or the primer coat 50' not only by using impression cylinders, but also by using digital printing methods, in particular inkjet printing.

Of course, the structure of the panel 12 can preferably be identical to that of the panel 10 and/or 10'.

The invention claimed is:

1. A rectangular panel, having a substrate facing surface, for lining a substrate, comprising:
   a base element, having a long edge and a short edge, comprising a decorative design on a visible surface opposite the substrate facing surface; and
   the decorative design depicting a plurality of strips shaped as parallelograms having long sides extending obliquely to a longitudinal direction of the base element and short sides forming a portion of the long edge of the base element,
   wherein at least two of the plurality of strips have strip widths different from one another, and
   wherein at least two adjacent strips of the plurality of strips extend into the short edge of the base element and are separated in part by a visible joint that extends toward the short edge of the base element and terminates in a transition region before the short edge.

2. The panel according to claim 1, wherein all the plurality of strips depict a decorative design of the same class of decorative design.

3. The panel according to claim 1, wherein the plurality of strips depict at least two different types of decorative design.

4. The panel according to claim 1, wherein the plurality of strips at least two different colorations.

5. The panel according to claim 1, wherein the obliquely extending long sides of the parallelograms are oriented at an angle of between approximately 30° and approximately 60° to the longitudinal direction.

6. The panel according to claim 1, wherein the decorative design is formed adjacently to the short edges of the base element, whereby, when the short edges of two identically designed panels provided with an identical decorative design adjoin one another, the decorative designs of the two panels transition into one another.

7. The panel according to claim 1, wherein the at least two adjacent strips of the plurality of strips extending into the short edge of the base element have a same type of decorative design.

8. The panel according to claim 1, wherein colorations of the at least two adjacent strips of the plurality of strips extending into the short edge of the base element transition into one another at least in the transition region between an end of the visible joint and the short side of the base element.

9. The panel according to claim 1, further comprising a decorative layer located opposite the substrate facing surface, which is printed with the decorative design.

10. The panel according to claim 1, further comprising a primer coat located opposite the substrate facing surface, which is printed with the decorative design.

11. The panel according to claim 9, further comprising a transparent protective layer is provided on the decorative layer.

12. The panel according to claim 1, wherein the decorative design is a wood decorative design and the panel further comprises a surface structure that is substantially synchronous with a grain of the wood decorative design.

13. A panel arrangement comprising a plurality of panels according to claim 1, wherein a course of the oblique long sides of the parallelograms of at least one of the panels are arranged to be mutually opposite to a course of the oblique long sides of the parallelograms of at least one other panel.

14. The panel arrangement according to claim 13, wherein an angle of the obliquely extending long sides of the parallelograms of the at least one panel and an angle of the obliquely extending long sides of the parallelograms of the other at least one panel are a same size.

15. The panel according to claim 2, wherein all the plurality of strips depict a wood decorative design.

16. The panel according to claim 5, wherein the obliquely extending long sides of the parallelograms are oriented at an angle of approximately 45° to the longitudinal direction.

17. The panel according to claim 10, further comprising a transparent protective layer is provided on the primer coat.

18. The panel arrangement according to claim 13, wherein the at least one of the panels and the at least one other panel are arranged adjacent to each other.

19. A rectangular panel, having a substrate facing surface, for lining a substrate, comprising:
  a base element, having a long edge and a short edge, comprising a decorative design on a visible surface opposite the substrate facing surface; and
  the decorative design depicting a plurality of strips shaped as parallelograms having long sides extending obliquely to a longitudinal direction of the base element and short sides forming a portion of the long edge of the base element,
  wherein at least two of the plurality of strips have strip widths different from one another,
  wherein two adjacent strips are separated from one another by a visual joint, and
  wherein the visual joint between two adjacent strips that extend into the short edge of the base element ends at a specified distance before the short edge of the base element.

20. A rectangular panel, having a substrate facing surface, for lining a substrate, comprising:
  a base element, having a long edge and a short edge, comprising a decorative design on a visible surface opposite the substrate facing surface; and
  the decorative design depicting a plurality of strips shaped as parallelograms,
  wherein each parallelogram includes long sides extending obliquely to a longitudinal direction of the base element, an outer short side forming a portion of the long edge of the base element, and inner short side located between the long edges at a joint with an inner short side of another parallelogram,
  wherein at least two of the plurality of strips have strip widths different from one another, and
  wherein at least two adjacent strips of the plurality of strips extend into the short edge of the base element and are separated in part by a visible joint that extends toward the short edge of the base element and terminates at a specified distance before the short edge of the base element.

* * * * *